US009951977B2

United States Patent
(12)

Michel et al.

(10) Patent No.: US 9,951,977 B2
(45) Date of Patent: Apr. 24, 2018

(54) ADSORBING HEAT EXCHANGER

(71) Applicant: International Business Machines Corporation, Armonk, NY (US)

(72) Inventors: Bruno Michel, Zurich (CH); Chin Lee Ong, Horgen (CH); Stephan Paredes, Zurich (CH); Patrick Ruch, Jenins (CH)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 14/813,566

(22) Filed: Jul. 30, 2015

(65) Prior Publication Data

US 2017/0030612 A1 Feb. 2, 2017

(51) Int. Cl.
*F25B 15/00* (2006.01)
*F25B 17/08* (2006.01)
(Continued)

(52) U.S. Cl.
CPC ............ *F25B 17/083* (2013.01); *F25B 25/02* (2013.01); *F25B 27/007* (2013.01); *F25B 11/02* (2013.01);
(Continued)

(58) Field of Classification Search
CPC ........... Y02B 30/62; F25B 15/10; F25B 15/06
(Continued)

(56) References Cited

U.S. PATENT DOCUMENTS 4,283,212 A * 8/1981 Graham ................. B01D 53/04 502/34
5,025,635 A * 6/1991 Rockenfeller ........ F25B 17/083 62/106
(Continued)

FOREIGN PATENT DOCUMENTS

CN 102191957 B 5/2014
GB 2521430 A 6/2015
(Continued)

OTHER PUBLICATIONS

Chen, "The Conversion of Low-Grade Heat into Power Using Supercritical Rankine Cycles," A dissertation submitted in partial fulfillment of the requirements for the degree of Doctor of Philosophy, University of South Florida, Nov. 10, 2010, 162 pages.
(Continued)

*Primary Examiner* — Melvin Jones
(74) *Attorney, Agent, or Firm* — Erik K. Johnson

(57) ABSTRACT

An apparatus and corresponding method for heat exchange. The heat exchange apparatus may include an adsorber device. The adsorber device is configured to draw heat from a first heat reservoir and transfer heat to a first heat sink. The heat exchange apparatus may include a heat exchanger fluidly connected to the adsorber device by the working fluid. The heat exchanger transfers heat to a second heat sink. The heat exchange apparatus may include an expansion device fluidly connected to the heat exchanger by the working fluid. The expansion device expands the working fluid, and exchanges heat with a second heat reservoir. The
(Continued)

Figure 1:
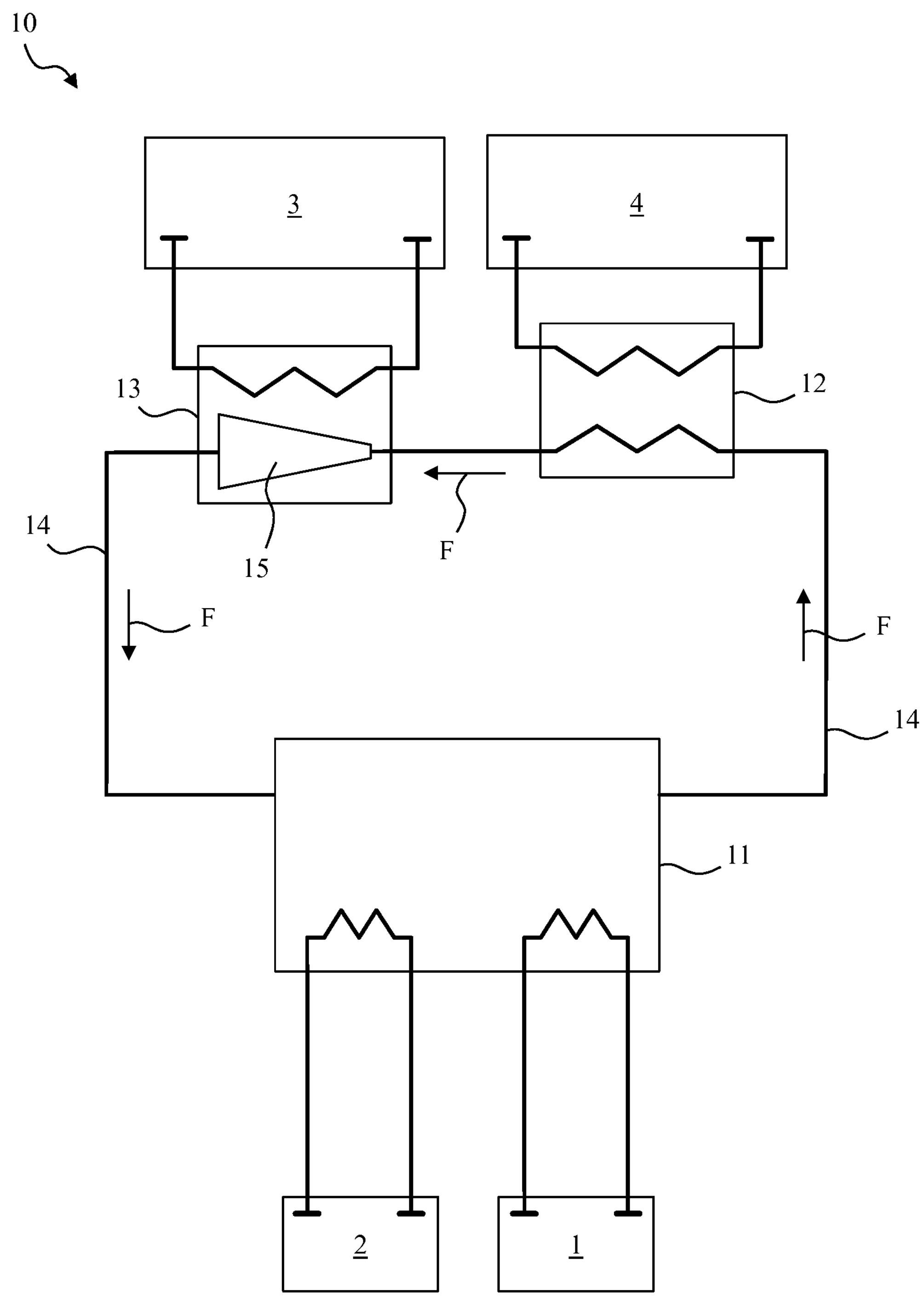

expansion device includes a turbine device for converting at least a part of an exergy of the working fluid during expansion into mechanical work. The heat exchange apparatus may include the adsorber device being fluidly connected to the expansion device by the working fluid.

19 Claims, 5 Drawing Sheets

(51) Int. Cl.
*F25B 25/02* (2006.01)
*F25B 27/00* (2006.01)
*F25B 11/02* (2006.01)
*F25B 27/02* (2006.01)

(52) U.S. Cl.
CPC .......... *F25B 27/02* (2013.01); *F25B 2400/14* (2013.01); *Y02B 30/64* (2013.01)

(58) Field of Classification Search
USPC .................. 62/101, 106, 476, 477, 478, 480
See application file for complete search history.

(56) References Cited

U.S. PATENT DOCUMENTS 5,404,728 A * 4/1995 Maier-Laxhuber ... F25B 17/086 62/106
5,535,817 A * 7/1996 Dunne .................. B01J 20/183 165/104.12
8,091,361 B1 1/2012 Lang
8,166,761 B2 5/2012 Moghtaderi et al.
8,572,959 B2 11/2013 Ingersoll et al.
2011/0023476 A1* 2/2011 Havel ...................... F01K 3/00 60/407

FOREIGN PATENT DOCUMENTS

WO 2013119998 A1 8/2013
WO 2015092675 A1 6/2015

OTHER PUBLICATIONS

Ho et al., "Comparison of the Organic Flash Cycle (OFC) to other advanced vapor cycles for intermediate and high temperature waste heat reclamation and solar thermal energy," Energy, vol. 42, 2012, pp. 213-223.
Saadatfar et al., "Thermodynamic Vapor Cycles for Converting Low- to Medium-grade Heat to Power: A State-of-the-art Review and Future Research Pathways," The Journal of MacroTrends in Energy and Sustainability, vol. 2, Issue 1, 2014, pp. 1-25.
Vosough, et al., "Improvement Power Plant Efficiency with Condenser Pressure," International Journal of Multidisciplinary Sciences and Engineering, vol. 2, No. 3, Jun. 2011, pp. 38-43.
Wang et al., "Adsorption refrigeration—An efficient way to make good use of waste heat and solar energy," Progress in Energy and Combustion Science, vol. 32, 2006, pp. 424-458.
Yong et al., "Adsorption Refrigeration: A Survey of Novel Technologies," Recent Patents on Engineering, 2007, vol. 1, pp. 1-21.
Wikipedia, the Free Encyclopedia, "Steam jet cooling," https://en.wikipedia.org/wiki/Steam_jet_cooling, Aug. 29, 2013, pp. 1-2.
Wikipedia, the Free Encyclopedia, "Refrigerant," https://en.wikipedia.org/wiki/Refrigerant, May 26, 2015, pp. 1-6.
Wischnewski et al., "Peace Software," Online—Calculation—Ammonia, http://www.peacesoftware.de/einigewerte/nh3_e.html, printed on Jul. 29, 2015, pp. 1-2.
Wikipedia, the Free Encyclopedia, "Heat capacity," https://en.wikipedia.org/wiki/Heat_capacity, Jul. 25, 2015, pp. 1-27.
Burg et al., "Working Fluid for a Device, Device and Method for Converting Heat Into Mechanical Energy," U.S. Appl. No. 141657,567, filed Mar. 13, 2015, 38 pages.

* cited by examiner

ADSORBING HEAT EXCHANGER

BACKGROUND

The present invention relates to an apparatus and a method for drawing heat from a first heat reservoir and a second heat reservoir and transferring heat to a first heat sink and a second heat sink using a working fluid.

Adsorption heat exchange systems, in particular adsorption refrigeration systems, often use solid adsorbent beds to adsorb and desorb an adsorbate depending on the temperature. A basic adsorption refrigeration system can contain four main components: a solid adsorbent bed, a condenser, an expansion valve and an evaporator. The solid adsorbent bed may desorb a refrigerant when heated and adsorb it when cooled. In this manner, the bed may be regarded as a thermal compressor. The refrigerant vapor is cooled and condensed to liquid in the condenser. The refrigerant condensate then expands to a lower pressure through an expansion device. The low pressure condensate vaporizes in an evaporator by drawing heat from a process medium or a medium to be cooled. When further heating no longer produces desorbed refrigerant from the adsorbent bed, the bed is isolated and allowed to return to the adsorption conditions. When the adsorption conditions are established in the bed, the refrigerant vapor from the evaporator is reintroduced to the bed to complete the cycle.

To ensure a continuous and stable operation, two or more adsorbent beds are used. A cycle time refers to a time for the completion of a full cycle of adsorption and desorption. The heating and cooling steps are reversed when the beds reach the desired upper and lower temperature limits. A cooling efficiency or coefficient of performance (COP) can be described by the ratio of a cooling effect to an energy input. A compactness of the system is reflected by specific cooling power (SCP), which is defined as the ratio of the cooling energy to the cycle time and adsorbent weight.

BRIEF SUMMARY

An embodiment of the invention may include a heat exchange apparatus. The heat exchange apparatus may include an adsorber device. The adsorber device adsorbs a working fluid in an adsorption temperature range or desorbs the working fluid in a desorption temperature range. The desorption temperature range is above the adsorption temperature range. The adsorber device is configured to draw heat from a first heat reservoir and transfer heat to a first heat sink. The heat exchange apparatus may include a heat exchanger fluidly connected to the adsorber device by the working fluid. The heat exchanger transfers heat to a second heat sink. The heat exchange apparatus may include an expansion device fluidly connected to the heat exchanger by the working fluid. The expansion device expands the working fluid, and exchanges heat with a second heat reservoir. The expansion device includes a turbine device for converting at least a part of an exergy of the working fluid during expansion into mechanical work. The heat exchange apparatus may include the adsorber device being fluidly connected to the expansion device by the working fluid.

An embodiment of the invention may include a heat exchange method. The heat exchange method may adsorb the working fluid. The heat exchange method may desorb the adsorbed working fluid by heating the working fluid using heat from a first heat reservoir. The heat exchange method may cool the desorbed working fluid in a heat exchanger. The heat exchange method may expand and heat the cooled working fluid in an expansion unit. The heat exchange method may convert at least a part of an exergy of the expanding working fluid into a mechanical work.

BRIEF DESCRIPTION OF THE SEVERAL DRAWINGS

Figure 2:
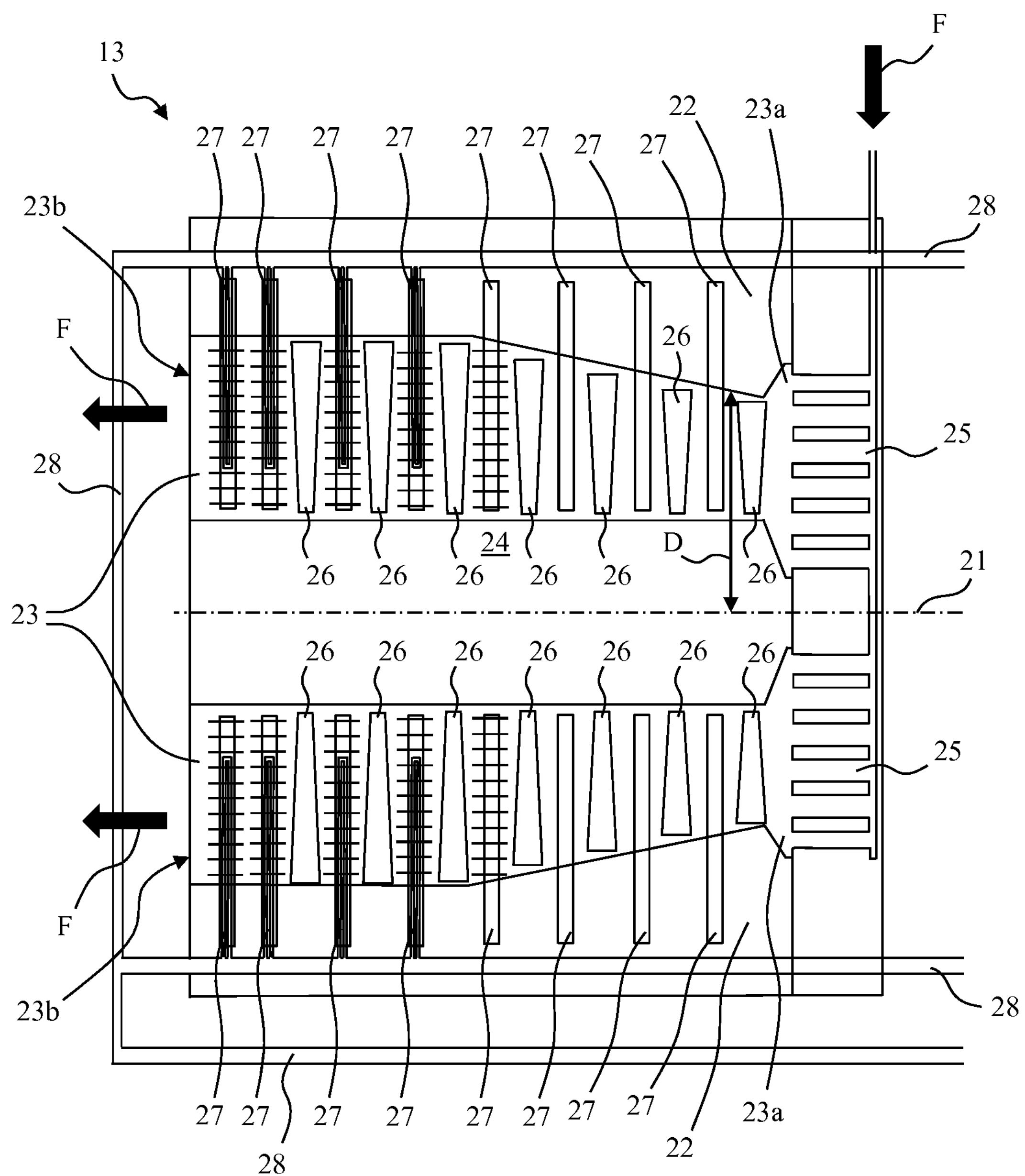
Figure 3:
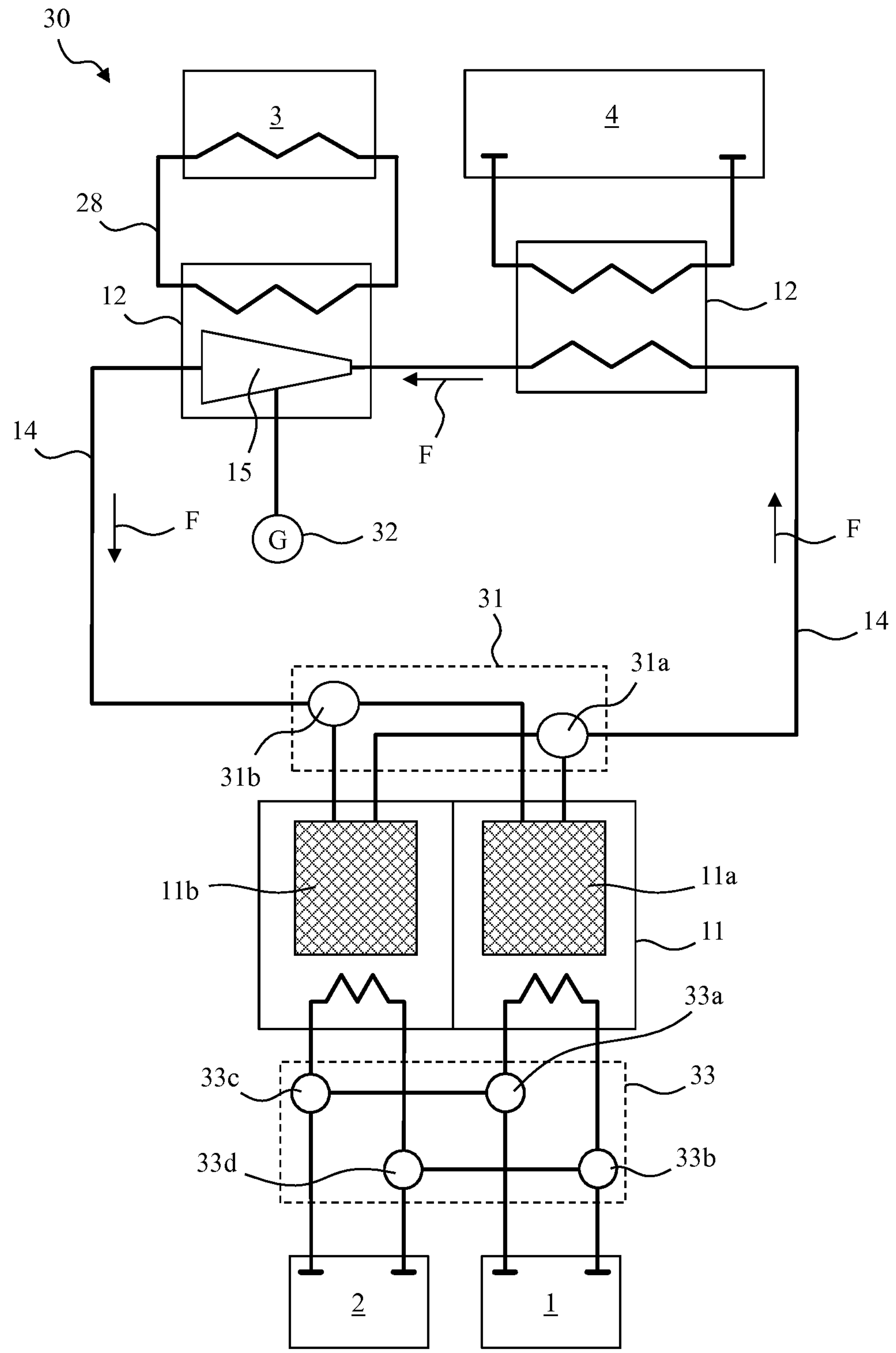
Figure 4:
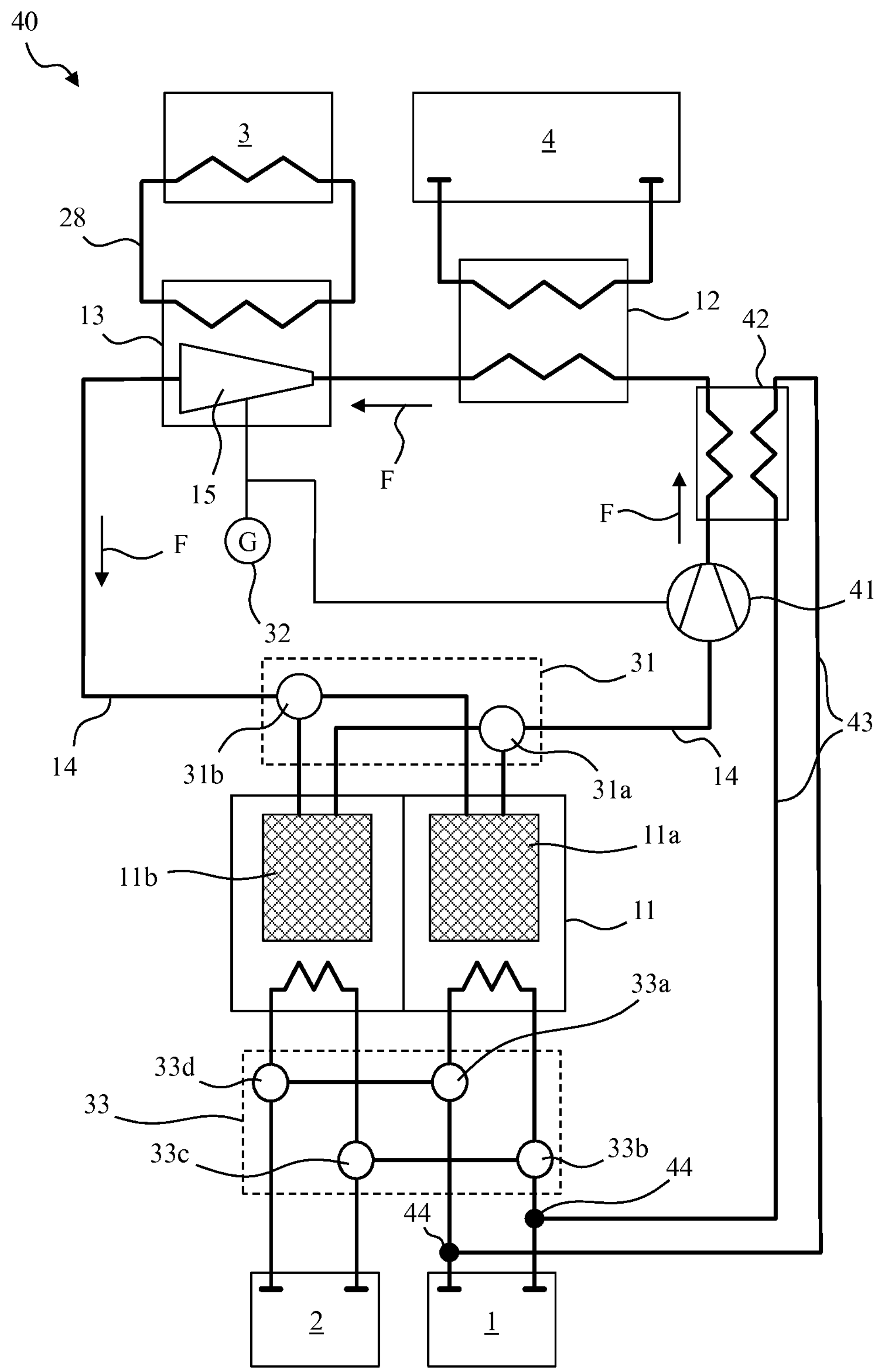
Figure 5:
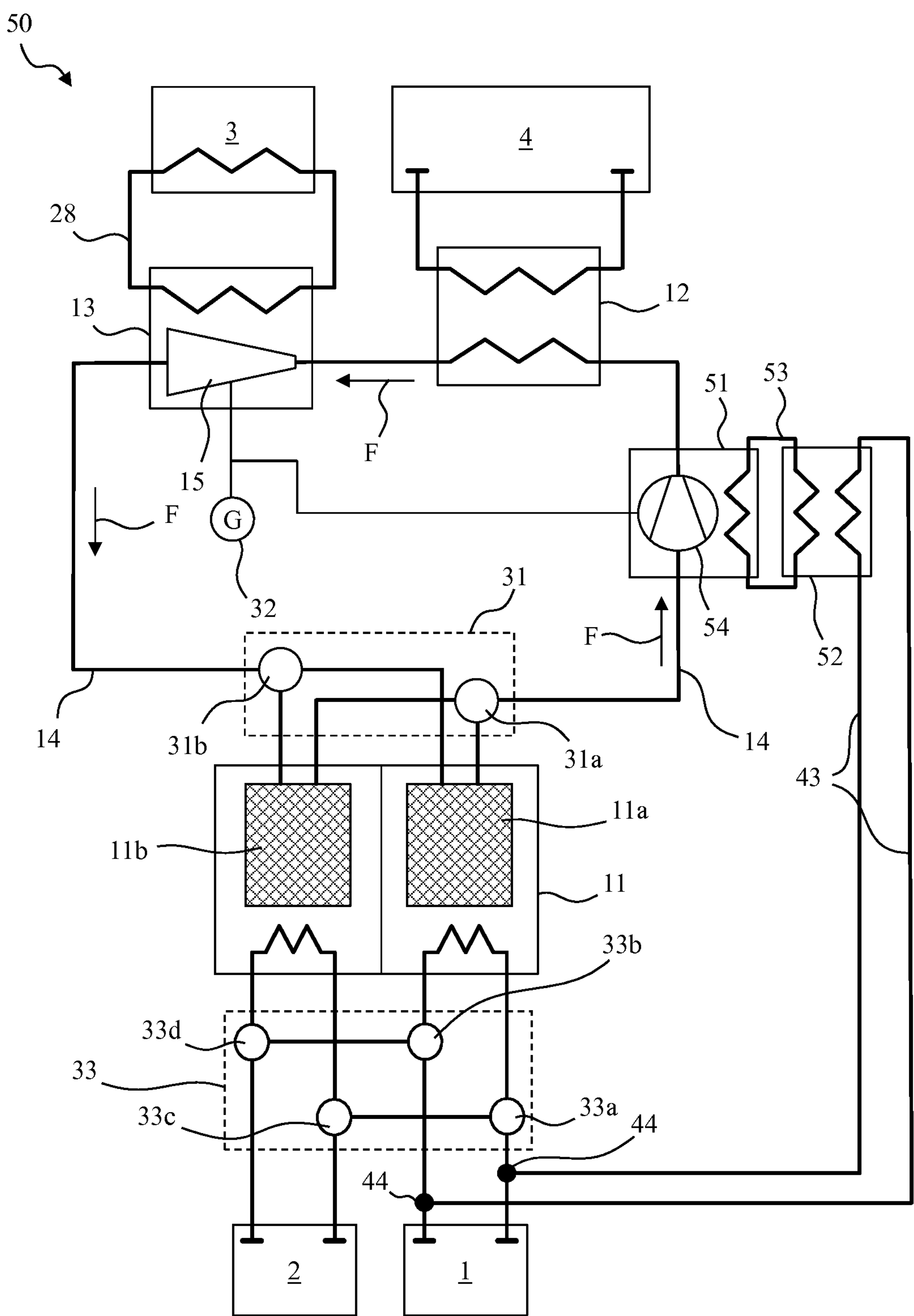

FIG. 1 shows a schematic view of an embodiment of an adsorption heat exchanger, FIG. 2 shows a schematic cross-sectional view of an embodiment of an expansion device, FIG. 3 shows a schematic view of a further embodiment of an adsorption heat exchanger, FIG. 4 shows a schematic view of a further embodiment of an adsorption heat exchanger, and FIG. 5 shows a schematic view of a further embodiment of an adsorption heat exchanger.

Similar or functionally similar elements in the figures have been allocated the same reference signs if not otherwise indicated. Elements of the figures are not necessarily to scale and are not intended to portray specific parameters of the invention. For clarity and ease of illustration, dimensions of elements may be exaggerated. The detailed description should be consulted for accurate dimensions. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will convey the scope of this disclosure to those skilled in the art. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

In the following, a working fluid, in particular water, can flow between two elements that are fluidly connected to each other. In the following, heat can be transferred between two elements that are thermally coupled to each other. Each of the two elements thermally coupled to each other may contain a process fluid in a fluid circuit. The fluid circuits of the thermally coupled elements can be separated by a solid wall that prevents the process fluids of different fluid circuits from mixing with each other.

In the following, an interconnection of two or more items refer to either one of the items or multiple items.

FIG. 1 shows a schematic view of an embodiment of an adsorption heat exchanger 10.

The adsorption heat exchanger 10 contains an adsorber device 11, a heat exchanger 12 and an expansion device 13. A fluid line 14 fluidly connects the adsorber device 11, the heat exchanger 12 and the expansion device 13 to one another in series. An arrow F indicates a flow direction of a working fluid W. The heat exchanger 12 is arranged downstream of the adsorber device 11. The expansion device 13 is arranged downstream of the heat exchanger 12. An outlet of the expansion device 13 is connected to an inlet of the adsorber device 11, and, as a result, a closed circuit for the working fluid W is provided. Preferably, the working fluid W contains water.

A first heat reservoir 1 and a first heat sink 2 are thermally coupled to the adsorber device 11. The first heat reservoir 1 preferably is a heat source and can include or be connected to, for example, a solar thermal collector, hot water storage or waste heat supply. The solar thermal collector can be configured to heat a fluid, e.g. water or oil, by absorbing thermal radiation from the sun. The hot water storage may be adapted to store and feed water at a temperature of 60° C. or above. The waste heat supply can be configured to collect waste heat, i.e. heat dissipated to surroundings, from the adsorption heat exchanger 10 for a re-use. Preferably, the first heat reservoir 1 supplies the adsorber device 11 with heat for the desorption of the working fluid W. For example, the first heat reservoir 1 allows for a temperature increase to at least 60° C., preferably at least 80° C. and more preferably at least 90° C.

The first heat sink 2 preferably is a heat sink and can include or be connected to, for example, an ambient water storage tank, a cooling tower, or incoming utility water. Preferably, the first heat sink 2 supplies the adsorber device 11 with cooling for the adsorption of the working fluid W. For example, the first heat reservoir 1 allows for a temperature decrease to at least 55° C., preferably at least 50° C. and more preferably at least 45° C.

The adsorber device 11 contains an adsorber chamber in which solid adsorbent beds are provided. The adsorbent beds may include zeolites, active carbon or silica. The first heat reservoir 1 and the first heat sink 2 may be required to be coupled to the adsorber device 11 in an alternating manner, since the adsorber device needs to be alternately heated and cooled. For this purpose, the adsorber device may be oscillated or repeatedly moved between the first heat reservoir 1 and the first heat sink 2. Alternatively or additionally, the adsorber device 11 may have ports that are alternately connected to the first heat reservoir 1 or to the first heat sink 2. In FIG. 1, the first heat reservoir and sink 1, 2 are depicted as being separately coupled to the adsorber device 11. It does not exclude that the first heat reservoir and sink 1, 2 use a common fluid path for transferring heat to/from the adsorber device 11, and a valve alternately connects the first heat reservoir 1 and first heat sink 2 to the adsorber device 11.

Heat may be transferred from the first heat reservoir 1 to the adsorber device 11, or to the heat reservoir from 12, by conducting a first process fluid, e.g. water, from the first heat reservoir 1, or the first heat sink, through the adsorber chamber in a fluid circuit, e.g. a tube. Preferably, a solid wall separates the fluid circuit from the adsorber chamber for preventing the process fluid of the heat reservoir, or heat sink, from mixing with the working fluid W in the adsorber device 11. Optionally, the fluid circuit in the adsorber chamber may have one or more curves, branches or windings inside the adsorber chamber for increasing a surface for heat transfer. Optionally, the fluid circuit may contain a plurality of fins for increasing a surface for heat transfer.

A second heat sink 4 is thermally coupled to the heat exchanger 12. The second heat sink 4 may include a cooling tower, a cooling circuit, a coolant or a cooling system for dissipating heat from the working fluid W. For example, the second heat sink 4 contains ambient air at 20° C.-60° C.

For example, the heat exchanger 12 may be formed as a cooling tower. The working fluid W may be conducted in a tube through the cooling tower. The tube may have multiple curves, windings or branches inside the heat exchanger 12 for increasing a surface for heat transfer. Optionally, a plurality of fins may be attached to the tube. The second heat sink 4 may be provided by an ambient air. A fan or ventilator device may support a convection of the ambient air through the heat exchanger 12.

A second heat reservoir 3 is thermally coupled to the expansion device 13. A temperature of the second heat reservoir 3 can be below a temperature of the first heat reservoir. In particular, the second heat reservoir 3 contains a process medium or a medium to be cooled. For example, the temperature of the second heat reservoir 3 is at most 30° C., preferably at most 20° C. and more preferably at most 12° C.

In particular, the second heat reservoir 3 may be ambient air to be cooled. A third fluid circuit, for example a tube, may run through the expansion device 13. A third process fluid, e.g. water, steam or vapor, may be conducted in the third fluid circuit that transfers heat from the second heat reservoir 3 to the expansion device 13. The third fluid circuit may have multiple curves, windings or branches. Further, a plurality of fins may be attached to the third fluid circuit.

Each of the first and second heat reservoirs 1, 3 as well as the first and second heat sinks 2, 4 may contain a fluid circuit for transferring heat and be thermally coupled to the adsorber device 11, heat exchanger 12 and expansion device 13, respectively.

The adsorber device 11 is configured to adsorb and desorb the working fluid W depending on a temperature in the adsorber device 11. Preferably, the adsorber device 11 adsorbs in an adsorption temperature range TA and desorbs in a desorption temperature range TD, with the adsorption temperature range TA being below the desorption temperature range TD. Due to these adsorption/desorption characteristics of the adsorber device 11, the adsorber device 11 can be employed as a thermal compressor, i.e. that increases a pressure or a density of the working fluid W depending on the temperature.

For example, the desorption temperature range TD can be 60° C. or higher, and the adsorption temperature range TA may lower than 60° C. In particular, an increasing amount of the working fluid W may be adsorbed by the adsorber device 11 when the temperature is reduced. An increasing amount of the working fluid W may be desorbed by the adsorber device 11 when the temperature is increased. For example, the adsorber device 11 can contain one or more adsorbent beds with zeolites, active carbon or silica as adsorbents.

In particular, the adsorber device 11 is configured to draw heat from the first heat reservoir 1, thereby heating and desorbing the working fluid W. Further, the adsorber device can be configured to transfer heat to the first heat sink 2, thereby cooling and adsorbing the working fluid W.

The working fluid W, being desorbed by the adsorber device 11, flows to the heat exchanger 12. The heat exchanger 12 can be configured to cool the working fluid W by drawing heat from the working fluid W and transferring it to the second heat sink 4.

The working fluid W flows along the fluid line 14 from the heat exchanger 12 to an expansion device 13. The expansion device 13 is configured to heat or expand the working fluid W. In particular, the expansion device 13 is further configured to evaporate the working fluid W. The expansion device 13 contains a turbine device 15 configured to convert at least a part of an exergy of the working fluid into a mechanical work. Here, the exergy of the working fluid W can refer to an amount of available energy which can be converted to work during a given process. For example, the exergy depends on a temperature gradient, a pressure gradient, volumetric expansion, chemical potential, etc.

For example, at least a part of a kinetic or volumetric energy of the working fluid W is converted to a mechanical work by the turbine device 15. At the same time, heat from the second heat reservoir 3 is transferred to the working fluid W inside the expansion device 13, thereby supporting the expansion and heating of the working fluid W. Further, the heat transfer from the second heat reservoir 3 to the working fluid W may prevent the working fluid W from condensing.

Accordingly, the expansion device 13 may convert a volumetric, expansion work of the working fluid W to a mechanical work in an isentropic process and transfer heat to the expanding working fluid W in an isothermal process. The expansion device 13 may thereby be regarded as an isothermal/isentropic expansion engine.

After passing through the expansion device 13, a temperature and pressure of the working fluid W can be reduced. For example, the temperature of the working fluid W after the expansion device 13 may be 1° C.-30° C., preferably 5° C.-20° C.

The working fluid W is then transported from the expansion 13 to the adsorber device 11. In total, a closed circuit for the working fluid W is provided including the adsorber device 11, the heat exchanger 12 and the expansion device 13 connected to one another in series. The working fluid W can be adsorbed by the adsorber device 11 in an adsorption temperature range TA.

Optionally, an additional heating circuit may be thermally coupled to the adsorber device 11 for pre-heating or for increasing a pressure of the adsorber device 11 and the working fluid W. Further, the additional heating circuit may be thermally coupled to the heat exchanger 12 and transfer the heat released at the heat exchanger 12 to the adsorber device 11, thereby at least partly a heat dissipation to the second heat sink 4.

FIG. 2 shows a schematic cross-sectional view of an embodiment of the expansion device 13.

For example, the expansion device 13 has a rotationally symmetrical shape with respect to an axis 21. The expansion device 13 includes a wall 22 that surrounds a cone-shaped channel 23. A diameter D between the axis 21 and the wall 22 increases from a fluid inlet 23*a* toward a fluid outlet 23*b*. A cylindrical shaft 24 extending from the fluid inlet 23*a* to the fluid outlet 23*b* may be arranged at the center of the channel 23. As a result, the channel 23 has a ring-shaped cross section perpendicular to the axis 21. A radial expansion, i.e. an expansion perpendicular to the axis 21, increases from the fluid inlet 23*a* toward the fluid outlet 23*b*.

The working fluid W passes a plurality of microchannels 25 before entering the channel 23 through the fluid inlet 23*a*. The microchannels may have a diameter of $10^{-7}$ m to $10^{-3}$ m and be configured to divide the working fluid W into small volumes, thereby increasing a surface of the working fluid W. Additionally, the microchannels 25 can be attached by heating element configured to heat the working fluid W. The working fluid W can expand toward the fluid outlet 23*b*. In particular, a vapor quality, i.e. a mass fraction of vapor in a vapor-liquid mixture of the working fluid W, increases up to 1 (or 100%) while expanding from the fluid inlet 23*a* toward the fluid outlet 23*b*.

A plurality of rotors 26 may be attached to the shaft 24. The rotors 26 may be arranged in a plurality of plains perpendicular to the axis 21. Further, the planes may be spaced from one another by a constant distance. Each plane may include multiple rotors 26 arranged in a symmetrical manner with respect to the axis 21. For example, one of the planes may include three rotors 26 that are arranged in an angle of 120° from one another. In FIG. 2, the rotors 26 are arranged in seven planes. In particular, the rotors 26 are configured to convert the volumetric work or the kinetic energy of the working fluid W into a mechanical work by being driven by a pressure gradient. The expanding working fluid W may impinge onto the rotors 26 and thereby propel the shaft 24.

A plurality of stators 27 may be arranged in a plurality of planes perpendicular to the axis 21. Each stator may extend from the wall 22 toward the shaft 24. In particular, the stators 27 are shaped as blades arranged in a flow direction of the working fluid W. At least a part of the stators 27 may be fluidly connected to an isothermal heat circuit 28 that thermally couples the second heat reservoir 3 and the expansion device 13 to each other. In particular, multiple fins may be attached to at least a part of the plurality of stators 27 for increasing a surface and a heat exchange between the working fluid W and the isothermal heat circuit 28.

The pressure and temperature of the working fluid W may be reduced during the expansion process in the channel 23. The isothermal heat circuit 28 can be configured to transfer heat from the second heat reservoir 3 to the working fluid W, thereby heating the working fluid W additionally and preventing it from condensing.

For example, the pressure of the working fluid W can be 180 mbar to 220 mbar at the fluid inlet 23*a*. At the fluid outlet 23*b*, the pressure of the working fluid W may be reduced to 1-30 mbar. For example, the temperature of the working fluid W may be reduced from 30° C.-50° C. at the fluid inlet 23*a* to 1° C. to 30° C. at the fluid outlet 23*b*.

As a result, at least a part of the exergy of the working fluid W can be converted into the mechanical work using the expansion device 13.

FIG. 3 shows a schematic view of a further embodiment of an adsorption heat exchanger 30. Unless otherwise noted, components from FIG. 3 that are identically numbered to those in FIG. 1 retain the same description and meaning as what was set forth in FIG. 1.

The adsorption heat exchanger 30 contains the adsorber device 11, the heat exchanger 12, the expansion device 13 and a valve device 31 fluidly connected to one another in series by the fluid line 14. A flow direction of the working fluid W is indicated by the arrow F. The first heat reservoir 1 and the first heat sink 2 are coupled to the adsorber device 11. The second heat reservoir 3 is thermally coupled to the expansion device 13. The second heat sink 4 is thermally coupled to the heat exchanger 12.

Preferably, the adsorber device 11 includes a first absorption unit 11*a* and a second absorption unit 11*b* each containing one or more adsorbent beds for adsorbing and desorbing the working fluid W in the absorption temperature range TA and in the desorption temperature range TD, respectively.

The first adsorption unit 11*a* may be heated by drawing heat from the first heat reservoir 1 and desorb the working fluid W. The desorbed working fluid W flows toward a first valve 31*a* of the valve device 31. The first valve 31*a* connects the first absorption unit 11*a* to the fluid line 14 such that the working fluid W desorbed by the first absorption unit 11*a* may flow to the heat exchanger 12.

When the desorption by the first adsorption unit 11*a* is completed, the first valve 31*a* may shut the connection between the first absorption unit 11*a*. In the meanwhile, the second adsorption unit 11*b* may be heated up and desorb the working fluid W. Then the first valve may connect the second absorption unit 11*b* to the fluid line 14. As a result, the adsorption heat exchanger 30 may be continuously operated. Optionally, a valve device between the first and second adsorption units 11*a*, 11*b* may allow for a heat or mass transfer between the first and second heat adsorption units 11*a*, 11*b*.

The desorbed working fluid W is cooled and in particular condensed in the heat exchanger 12 and flows to the expansion device 13. The isothermal heat circuit 28 thermally couples the expansion device 13 and the second heat reservoir 3 to each other. An expansion work and driving the rotors 26 of the turbine device 15 may be an adiabatic process, whereby the thermal coupling of the second heat reservoir 3 with the expansion device 13 allows for an isothermal process.

As described above, the turbine device 15 can be configured to convert at least a part of the exergy of the working fluid W into the mechanical work. Further the turbine device can be configured to couple the mechanical work into a generator device 32. The generator device 32 is configured to convert the mechanical work from the turbine device 15 into an electrical power.

The second valve 31*b* leads the working fluid W alternately to the first absorption unit 11*a* or to the second absorption unit 11*b*. Preferably, the working fluid W, after passing through the expansion device 13, is led to the adsorption unit 11*a*, 11*b* that has completed a desorption process and is ready for adsorption. Further, the second valve 31*b* may be configured to connect the fluid line 14 to the first absorption unit 11*a* while the first valve 31*a* connects the second absorption unit 11*b* to the fluid line 14, and vice versa.

The adsorption heat exchanger 30 may further contain a heat valve device 33 for controlling a thermal coupling of the first heat reservoir 1 and the first heat sink 2 to the adsorber device 11. The heat valve device 33 may contain a plurality of heat valves 33*a*-33*d* configured to alternately couple the first heat reservoir 1 to the first adsorption unit 11*a* or the second adsorption unit 11*b* or the first heat sink 2 to the first adsorption unit 11*a* or the second adsorption unit 11*b*. For example, the heat valves 33*a*, 33*b* may thermally couple the first heat reservoir 1 to the first adsorption unit 11*a* for heating the first adsorption unit 11*a*. At the same time, the first heat sink 2 may be decoupled, or the heat valves 33*c*, 33*d* may thermally couple the first heat sink 2 to the second adsorption unit 11*b* for cooling. After the desorption process of the first adsorption unit 11*a*, the heat valves 33*c*, 33*d* may thermally couple the first heat sink 2 to the first adsorption unit 11*a* for cooling, and the heat valves 33*a*, 33*b* may thermally couple the first heat reservoir 1 to the second adsorption unit 11*b* for heating. The cooling and heating processes can support the adsorption and desorption processes, respectively, by the adsorber device 11.

Additionally, the fluid flow F of the working fluid W in the fluid line 14 and through the devices of the adsorption heat exchanger 30 may be generated, or at least supported, by one or more pump devices. Moreover, further process fluids may be used for heat transfer between the adsorber device 11 and the first heat reservoir 1 or between the heat exchanger 12 and the second heat sink 4. The further process fluids or a process fluid in the isothermal fluid circuit 28 may be supported by the one or more pump devices. Preferably, the pump devices may be driven at least partly by the electrical power generated by the generator device 32.

FIG. 4 shows a schematic view of a further embodiment of an adsorption heat exchanger 40. Unless otherwise noted, components from FIG. 4 that are identically numbered to those in FIG. 3 retain the same description and meaning as what was set forth in FIG. 3.

The adsorption heat exchanger 40 contains the adsorber device 11, the heat exchanger 12, the expansion device 13 and the valve device 31 fluidly connected to one another in series by the fluid line 14. The first heat reservoir 1 and the first heat sink 2 are thermally coupled to the adsorber device 11. In particular, the heat reservoir 1 may be a heat source. The second heat reservoir 3 is thermally coupled to the expansion device 13. The second heat sink 4 is thermally coupled to the heat exchanger 12.

The expansion device 13 includes the turbine device 15 that is configured to convert a part of the exergy of the working fluid W into the mechanical work and transfer it to the generator device 32. The generator device 32 is configured to generate the electrical power from the mechanical work.

The valve device 31 with the first and second valves 31*a*, 31*b* is configured to alternately connect the first and second adsorption units 11*a*, 11*b* to the fluid line 14. The heat valve device 33 with the first and second heat valves 33*a*, 33*b* is configured to alternately connect the first heat reservoir 1 or the first heat sink 2 to the first or second adsorption units 11*a*, 11*b*. The functions and structures of the elements, units and devices of the adsorption heat exchanger 40 are similar to those of the apparatuses 10, 30.

In addition, the adsorption heat exchanger 40 contains a compressor device 41 configured to adiabatically compress the working fluid W, thereby increasing the temperature of the working fluid W. Here, an adiabatic process does not completely exclude heat transfer between the working fluid W and its surroundings. Further, the adsorption heat exchanger 40 contains an auxiliary heat exchanger 42 configured to transfer heat from the working fluid W compressed by the compressor device 41 to an auxiliary fluid WA, for example water, in an auxiliary fluid line 43. The auxiliary fluid line 43 may be thermally coupled to the adsorber device 11, for example, for reducing an amount of heating energy extracted from the heat reservoir 1 required to reach the desorption temperature range TD.

The compressor device 41 may be configured to receive at least a part of mechanical work from the turbine device 15. For example, the compressor device 41 and the turbine device 15 may be connected via a prolongation of the shaft 24, thereby utilizing an inertia of the rotating shaft 24 and the rotors 26.

For example, the pressure of the working fluid W can be increased by 30 mbar-70 mbar. The temperature of the working fluid W may be increased by 70° C.-130° C.

The auxiliary heat exchanger 42 may be configured to heat the auxiliary fluid WA in the fluid line 43 which transports the heated auxiliary fluid WA to a junction 44. At the junction 44, heat from the auxiliary fluid WA can be transferred to the adsorber device 11. In this manner, the pressure of the working fluid W can be increased to allow for reusing the heat contained in the working fluid W. In addition, the pressure of the desorbed working fluid W can be reduced with respect to the apparatuses 10, 30. As a result, the amount of the desorbed working fluid W can be increased. Further, the temperature of the working fluid W during the desorption can be increased, thereby reducing a heat input required for driving the adsorber device 11, i.e. supporting the first heat reservoir 1 and reducing an energy input of the adsorption heat exchanger 40. Increasing the pressure of the working fluid W further can lead to a higher exergy of the working fluid W in the expansion device 13, and therefore a higher power yield at the turbine device 15.

FIG. 5 shows a schematic view of a further embodiment of an adsorption heat exchanger 50. Unless otherwise noted, components from FIG. 5 that are identically numbered to those in FIG. 4 retain the same description and meaning as what was set forth in FIG. 4.

The adsorption heat exchanger 50 contains the adsorber device 11, the heat exchanger 12, the expansion device 13 and the valve device 31 fluidly connected to one another in series by the fluid line 14. The first heat reservoir 1, in particular a heat source, and the first heat sink 2 are thermally coupled to the adsorber device 11. The second heat reservoir 3 is thermally coupled to the expansion device 13. The second heat sink 4 is thermally coupled to the heat exchanger 12.

The expansion device 13 includes the turbine device 15 that is configured to convert a part of the exergy of the working fluid W into the mechanical work and transfer it to the generator device 32. The generator device 32 is configured to generate the electrical power from the mechanical work.

The valve device 31 with the first and second valves 31*a*, 31*b* is configured to alternately connect the first and second adsorption units 11*a*, 11*b* to the fluid line 14. The heat valve device 33 with the first and second heat valves 33*a*, 33*b* is configured to alternately connect the first heat reservoir 1 or the first heat sink 2 to the first or second adsorption units 11*a*, 11*b*. The functions and structures of the elements, units and devices of the adsorption heat exchanger 50 are similar to those of the apparatuses 10, 30, 40.

In addition, the adsorption heat exchanger 50 contains a compressor heat exchanger 51 and an auxiliary heat exchanger 52 that are thermally coupled to each other by an auxiliary fluid circuit 53. The compressor heat exchanger 51 includes a compressor device 54 configured to compress the working fluid W. Simultaneously, heat from the working fluid W after being compressed is transferred to the auxiliary fluid circuit 53 which further transfers the heat from the compressor device 54 to the auxiliary working fluid WA, for example water, in the auxiliary fluid line 43. The heat exchange between the auxiliary fluid circuit 53 and the auxiliary fluid line 43 may take place inside the auxiliary heat exchanger 52. The auxiliary fluid line 43 is thermally coupled to the adsorber device 11 as described in FIG. 4.

The compressor device 54 may be configured to receive at least a part of mechanical work from the turbine device 15. For example, the compressor device 54 and the turbine device 15 may be connected via a prolongation of the shaft 24, thereby utilizing an inertia of the rotating shaft 24 and the rotors 26. The compressor device 54 is configured to compress the working fluid adiabatically. The compression may be a formed in multiple steps, for example by increasing the pressure of the working fluid W using a plurality of rotating rotors, and heat exchanger units may be arranged between at least two of the compression steps for drawing heat from the adiabatically compressed working fluid W and transferring it to the auxiliary closed circuit 53. Accordingly, a heat exchange takes place during the adiabatic compression of the working fluid W, and the heat from the compressed working fluid W can be re-used for increasing an efficiency of the adsorption heat exchanger 50.

For example, the pressure of the working fluid can be increased by 40° C.-100° C. during the compression in the compressor device 54. The auxiliary working fluid WA may reach a temperature of 100° C.-160° C. after drawing heat from the compressor heat exchanger 51. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. A heat exchange apparatus comprising:

an adsorber device, wherein the adsorber device adsorbs the working fluid in an adsorption temperature range or desorbs a working fluid in a desorption temperature range, wherein the desorption temperature range is above the adsorption temperature range, and wherein the adsorber device is configured to draw heat from a first heat reservoir and transfer heat to a first heat sink;

a heat exchanger fluidly connected to the adsorber device by the working fluid, wherein the heat exchanger transfers heat to a second heat sink; and an expansion device fluidly connected to the heat exchanger by the working fluid, wherein the expansion device expands the working fluid, and wherein the expansion device exchanges heat with a second heat reservoir, and wherein the expansion device includes a turbine device for converting at least a part of an exergy of the working fluid during expansion into mechanical work; and wherein the adsorber device is fluidly connected to the expansion device by the working fluid.

2. The apparatus of claim 1, further comprising a generator device connected to the turbine device, wherein the generator device generates an electrical power from the mechanical work exerted on the turbine device.

3. The apparatus of claim 2, further comprising at least one pump device fluidly connected to the adsorber device by the working fluid, wherein the at least one pump device increases a flow of the working fluid in the apparatus, and wherein the pump device is at least partly driven by the electrical power generated by the generator device.

4. The apparatus of claim 2, further comprising a control unit, wherein the control unit controls a flow of the working fluid in the apparatus, and wherein the control unit is at least partly driven by the electrical power generated by the generator device.

5. The apparatus of claim 1, wherein the turbine device includes at least one rotor element, wherein the at least one rotor element converts at least a part of the exergy of the working fluid into the mechanical work.

6. The apparatus of claim 1, wherein the turbine device includes one or more stators having a heat transfer element, wherein the heat transfer element increases a temperature of the working fluid.

7. The apparatus of claim 1, wherein the expansion device comprises one or more heating elements, a plurality of microchannels, and combinations thereof.

8. The apparatus of claim 1, further comprising an expansion device heat exchanger thermally coupled between the expansion device and to the second heat reservoir, wherein the expansion device heat exchanger transfers heat from the second heat reservoir to the expansion device.

9. The apparatus of claim 1, wherein the adsorber device further comprises at least two adsorption units thermally coupled to one another, and wherein a valve device is connects the at least two adsorption units to the heat exchanger or the expansion device.

10. The apparatus of claim 1, wherein the second heat sink comprises ambient air.

11. The apparatus of claim 1, wherein the heat exchanger includes a condenser device.

12. The apparatus of claim 1, wherein the second heat reservoir comprises ambient air to be chilled.

13. The apparatus of claim 1, wherein the first heat reservoir includes a solar thermal collector, hot water storage or a waste heat supply.

14. The apparatus of claim 1, further comprising a compressor device, wherein the compressor devices compresses the working fluid.

15. The apparatus of claim 14, further comprising an auxiliary heat exchanger, wherein the auxiliary heat exchanger transfers heat from the working fluid to the adsorber device.

16. The apparatus of claim 14, further comprising a heat transfer element located in the compressor device, wherein the heat transfer element draws heat from the working fluid during compression by the compressor device; and an auxiliary heat exchanger, wherein the auxiliary heat exchanger is configured to transfer the heat from the compressor device to the adsorber device.

17. The apparatus of claim 14, further comprising a generator device connected to the turbine device, wherein the generator device generates an electrical power from the mechanical work exerted on the turbine device, and wherein the compressor device is at least partly driven by the electrical power.

18. A method for heat exchange comprising:

adsorbing a working fluid;

desorbing the adsorbed working fluid by heating the working fluid using heat from a first heat reservoir, wherein a portion of the heat is an auxiliary heat created during the heat exchange;

adiabatically compressing the desorbed working fluid, wherein adiabatically compressing the desorbed working fluid is at least partly supported by mechanical work created during the heat exchange;

cooling the desorbed working fluid in a heat exchanger, thereby removing heat from the compressed working fluid to provide the auxiliary heat;

expanding and heating the cooled working fluid in an expansion unit;

converting at least a part of an exergy of the expanding working fluid into the mechanical work created during the heat exchange.

19. A method for heat exchange comprising:

adsorbing a working fluid;

compressing the adsorbed working fluid, wherein compressing the working fluid is at least partly supported by the mechanical work;

removing heat from the working fluid while being compressed to provide an auxiliary heat; and desorbing the adsorbed working fluid by heating the working fluid using heat from a first heat reservoir, wherein a portion of the heating is supported by the auxiliary heat cooling the desorbed working fluid in a heat exchanger;

expanding and heating the cooled working fluid in an expansion unit; and converting at least a part of an exergy of the expanding working fluid into a mechanical work.

* * * * *